United States Patent
Min et al.

(10) Patent No.: US 6,790,344 B1
(45) Date of Patent: Sep. 14, 2004

(54) LIQUID-PHASE ADSORPTION PROCESS FOR REMOVING AND CONCENTRATING HETEROATOM COMPOUNDS IN HYDROCARBONS

(75) Inventors: Wha-Sik Min, Taejon (KR); Sin-Young Khang, Taejon (KR); Dong-Soon Min, Taejon (KR); Jae-Wook Ryu, Taejon (KR); Kwan-Sik Yoo, Taejon (KR); Jyu-Hwan Kim, Taejon (KR)

(73) Assignee: SK Corporation, Seoul (KR)

( * ) Notice: Subject to any disclaimer, the term of this patent is extended or adjusted under 35 U.S.C. 154(b) by 0 days.

(21) Appl. No.: 09/719,463
(22) PCT Filed: Jan. 18, 2000
(86) PCT No.: PCT/KR00/00031
  § 371 (c)(1),
  (2), (4) Date: Dec. 11, 2000
(87) PCT Pub. No.: WO00/64556
  PCT Pub. Date: Nov. 2, 2000

(30) Foreign Application Priority Data

Apr. 24, 1999 (KR) .......................................... 1999-14744
Oct. 14, 1999 (KR) .......................................... 1999-44470

(51) Int. Cl.[7] .......................................... C10G 21/02
(52) U.S. Cl. .................. 208/254 R; 208/323; 208/333; 208/334
(58) Field of Search .............................. 208/254 R, 323, 208/333, 334

(56) References Cited

U.S. PATENT DOCUMENTS

| | | | |
|---|---|---|---|
| 4,846,962 A | 7/1989 | Yao | 208/301 |
| 5,888,402 A | 3/1999 | Hommeltoft et al. | 210/690 |

FOREIGN PATENT DOCUMENTS

JP  411169601 A  6/1999

*Primary Examiner*—Walter D. Griffin
*Assistant Examiner*—Tam M. Nguyen
(74) *Attorney, Agent, or Firm*—Drinker Biddle & Reath LLP

(57) ABSTRACT

Disclosed is a liquid phase adsorption process for removing and concentrating heteroatom compounds in hydrocarbons (HCH), comprising the steps of adsorption, copurging and regeneration. In the adsorption step, a liquid hydrocarbon stream is fed to an adsorber, which adsorbs HCH and returns adsorption effluent. In the copurging step, HCH, which are extracted from the previous regeneration, are applied to the adsorber, displacing the copurging effluent. In the regeneration step, a polar solvent is flowed through the adsorber, purging HCH. Most of the HCH are then set aside for use in the next copurging step, while a small amount of the HCH are taken out from the process as HCH product. The present invention is economically advantageous in effectively removing HCH from hydrocarbon streams and increasing the concentration of HCH within an HCH product.

5 Claims, 7 Drawing Sheets

LIQUID-PHASE ADSORPTION PROCESS FOR REMOVING AND CONCENTRATING HETEROATOM COMPOUNDS IN HYDROCARBONS

FIELD OF THE INVENTION

The present invention relates, in general, to a method of treating hydrocarbons. More particularly, the present invention pertains to a liquid-phase adsorption process, which removes heteroatom compounds such as phenols, naphthenic acids, pyridines, pyrroles, thiophenes, quinolines or carbazoles from a liquid hydrocarbon stream, and concentrates them into heteroatom compound products.

BACKGROUND OF THE INVENTION

Hydrocarbons include compounds that contain heteroatoms such as nitrogen, sulfur and/or oxygen. Such heteroatom compounds in hydrocarbons are exemplified by phenols, naphthenic acids, pyridines, pyrroles, thiophenes, quinolines and carbazoles, of which polarities are higher than those of hydrocarbons. For the sake of convenience, heteroatom compounds in hydrocarbons are abbreviated, hereinafter to "HCH".

As the distillation cut point of petroleum crude increases, the HCH content within the distillate increases. Physical properties and compositions of HCH vary with different petroleum crudes, however, HCH are generally considered as undesirable constituents: naphthenic acids corrode metals and poison catalysts; phenols from a FCC (Fluid Catalytic Cracking) process degrade fuel quality; and basic organic nitrogen compounds are known to interfere with hydrodesulphurization reactions.

Adsorption has long been used to remove or concentrate polar compounds such as HCH. In commercialization of an adsorption process, however, development of an effective regeneration method is essential, since an adsorbent has a finite adsorption capacity. In general, regeneration can be carried out by means of thermal energy, chemical reaction, inert gas or solvents. The present invention uses a polar solvent, and an oxygen-containing polar solvent such as an alcohol, a ketone, or an ether, can be used to regenerate the adsorbent. Applied to the adsorbent after adsorption is completed, the polar solvent purges the adsorbate and returns a regeneration effluent, which is an adsorbate-polar solvent mix. Adsorbate is readily separable from the regeneration effluent subject to distillation, however, the problem is that the adsorbate includes not only HCH, but also hydrocarbons. In fact, the hydrocarbon portion in the adsorbate is much larger than the HCH portion in the adsorbate, and this is referred to as coadsorption phenomenon. HCH quantities in the adsorbate are merely 10% or less, while hydrocarbons take up the rest of the adsorbate when kerosene or LGO (Light Gas Oil) are adsorption-treated. Under coadsorption conditions, therefore, process yield, i.e. hydrocarbon yield, is reduced. To resolve this problem, a special step, which selectively displaces coadsorbed hydrocarbons from the adsorbate prior to regeneration, is introduced. This step is referred to as "copurging". Typical copurging methods, which are dependant upon hydrocarbons, are as follows:

In case the feedstock has a low boiling point, e.g., the feedstock is naphtha:

Naphtha with a boiling point range of 80 to 130° C. is fed to an adsorber in the liquid phase in an upward direction, and an adsorption effluent, i.e., a naphtha-solvent mix, is returned. The adsorption effluent is then separated from the solvent in a fractionator. Copurging is carried out by injecting a vaporized naphtha stream into the adsorber in a downward direction to displace coadsorbed naphtha from the adsorber. Finally, solvent flushes the adsorber in the downward direction, purging HCH from the adsorber. Regeneration effluent, which is an HCH-solvent mix, is separated in the other fractionator, while the copurging effluent is adsorbed again in the beginning of a subsequent adsorption.

In case the feedstock has a high boiling point, e.g., the feedstock is LGO:

LGO requires a lot of energy to be fully evaporated. Copurging is therefore conducted with a non-polar solvent as depicted in FIG. 1. LGO, of boiling point range 225° C.~365° C., is fed to an adsorber in an upward direction. After adsorption is completed, copurging is carried out by applying a non-polar solvent such as hexane to the adsorber, in a downward direction, to selectively desorb coadsorbed LGO. Finally, in the downward direction, a polar solvent such as MTBE (Methyl-Tertiary-Butyl-Ether) is injected to the adsorber to purge remaining adsorbate. This process returns a small amount of a highly concentrated HCH product, but nevertheless, requires 4 fractionators to recover the two different solvents. Operating costs are also high because separation of the two solvents is costly, and copurging effluent is adsorbed again due to its high HCH content.

SUMMARY OF THE INVENTION

It is an object of the present invention to provide a process for removing and concentrating heteroatom compounds from a liquid hydrocarbon stream, in which adsorption, copurging and regeneration are conducted in an adsorber that is charged with silica gel and maintained in a fully wetted condition, comprising the following steps:

i) feeding the liquid hydrocarbon stream to the adsorber, and returning a first effluent, which is a polar solvent-rich mix, to a second fractionator before sending a second effluent, which is a polar solvent and adsorption treated hydrocarbon mix, to a first fractionator;

ii) injecting a fraction of heteroatom compounds that are extracted in the previous operation to the adsorber, and returning a third effluent, which is a polar solvent and adsorption treated hydrocarbon mix, to a first fractionator before sending a fourth effluent, which is an adsorption treated hydrocarbon and heteroatom compounds mix, to a feed drum for re-adsorption; and iii) applying the polar solvent to the adsorber, and returning a fifth effluent, which is a heteroatom compound rich mix; to a heteroatom compound drum before sending a sixth effluent, which is a heteroatom compounds and polar solvent mix, to the second fractionator.

In the present invention, the liquid hydrocarbon comprises middle distillates with a boiling range of 100 to 400° C. and the heteroatom compounds are nitrogen atom containing compounds and oxygen atom containing compounds. The first fractionator separates adsorption-treated hydrocarbons from the polar solvent, which are reused in regeneration. The second fractionator separates heteroatom compounds, of which a fraction is taken out as a HCH product and the residue is used in copurging, from the polar solvent, which is reused in regeneration.

As mentioned above, to remove and concentrate HCH, a liquid phase adsorption process has been developed, which comprises steps of adsorption, copurging and regeneration.

In an effort to attain commercial feasibility, an adsorbent, a polar solvent, and a copurging method are carefully selected. Silica gel is identified as a suitable adsorbent for its regenerability as well as ability to maintain its adsorption effectiveness; MTBE (Methyl-Tertiary-Butyl-Ether), ETBE (Ethyl-Tertiary-Butyl-Ether) or TAME (Tertiary-Amyl-Methyl-Ether) is selected for its low latent heat and compatibility with the adsorbent; and the copurging method is developed to effectively displace coadsorbed hydrocarbons The operation sequence of the process is illustrated in FIG. 3 and FIG. 4: in "Step 1", a predetermined amount of hydrocarbon is fed to an adsorber, which is maintained in the vicinity of 50° C., in an upward or downward direction; in "Step 2", copurging is carried out by injecting HCH, which have been extracted and set aside from the previous regeneration, to the adsorber, displacing coadsorbed hydrocarbons from adsorbate, in an upward or downward direction; in "Step 3", a polar solvent such as MTBE is applied to the adsorber, purging remaining adsorbate"; and in "Step 4", a fraction of HCH, which is obtained in "Step 3", is taken out as an HCH product while the rest is reserved for the next copurging.

A continuous adsorption unit, shown as FIG. 6, is built according to the present invention. The process repeats the aforementioned steps until reaching an equilibrium. As a result, the present invention is feasible. As expected, 60% or more of HCH are removed from the hydrocarbon feedstock while as little as 2.0% of an HCH product is generated.

BEST MODE FOR CARRYING OUT THE INVENTION

The objective of the present invention is to develop a liquid phase adsorption process that removes and concentrates HCH in an economical and efficient way. In an effort to realize the aforementioned objectives, the adsorption process has been developed pursuing three technical goals: identification of a semi-permanent adsorbent that lasts for an extended period of time after a series of adsorption and regeneration cycles while maintaining its adsorption effectiveness; selection of a polar solvent that regenerates the adsorbent effectively and is recovered economically; and development of an effective copurging method that minimizes an HCH product amount and concentrates HCH therein.

Identification of a Semi-permanent Adsorbent

The nitrogen removal ratio is measured to quantify adsorption effectiveness of an adsorbent. The nitrogen content in a hydrocarbon serves as a barometer of HCH presence therein, and the nitrogen removal ratio is monitored to compare the adsorption effectiveness of each adsorbent. Although alumina and bauxite are superior in their initial adsorption effectiveness, nitrogen removal ratios of successive adsorptions decrease sharply. On the other hand, silica gel seems to be less effective in the initial test, however, maintains adsorption effectiveness for an extended period of time. Consequently, silica gel is selected according to the present invention for use in the process. Furthermore, silica gel with a pore size of 40~100Å and a pore volume ratio to bulk volume of 0.40 or higher is found to be desirable.

Selection of Polar Solvent

Polar solvents including methanol, MTBE, and acetone are tested to determine the most suitable solvent for the process. In the case of methanol, an additional thermal gas purging step is required to recover the solvent. Regeneration effluent, which is an adsorbate-methanol mix, also demands a large amount of energy for separation due to methanol's high latent heat. On the other hand, MTBE requires only a small amount of energy for separation due to its low latent heat, which is a quarter and one third of the latent heat of methanol and acetone, respectively.

Also, MTBE turns out to be compatible with silica gel, not degrading the adsorbent's performance. Consequently, MTBE is selected according to the present invention to be used in the adsorption process. Physical properties of acetone, methanol and MTBE are given in Table 1.

TABLE 1

| | Mol. Formula | Specific Gravity | Boiling Point (° C.) | Latent Heat (Btu/gal) | Solubility with LGO | Solubility Water (cc/100 cc) |
|---|---|---|---|---|---|---|
| Acetone | $C_3H_6O$ | 0.791 | 56.0 | 2,580 | Fully Miscible | Fully Miscible |
| Methanol | $CH_4O$ | 0.791 | 64.7 | 3,340 | Phase Separated | Fully Miscible |
| MTBE | $C_5H_{12}O$ | 0.740 | 55.3 | 863 | Fully Miscible | 1.4 |

Development of an Economically Feasible Copurging

Figure 1:
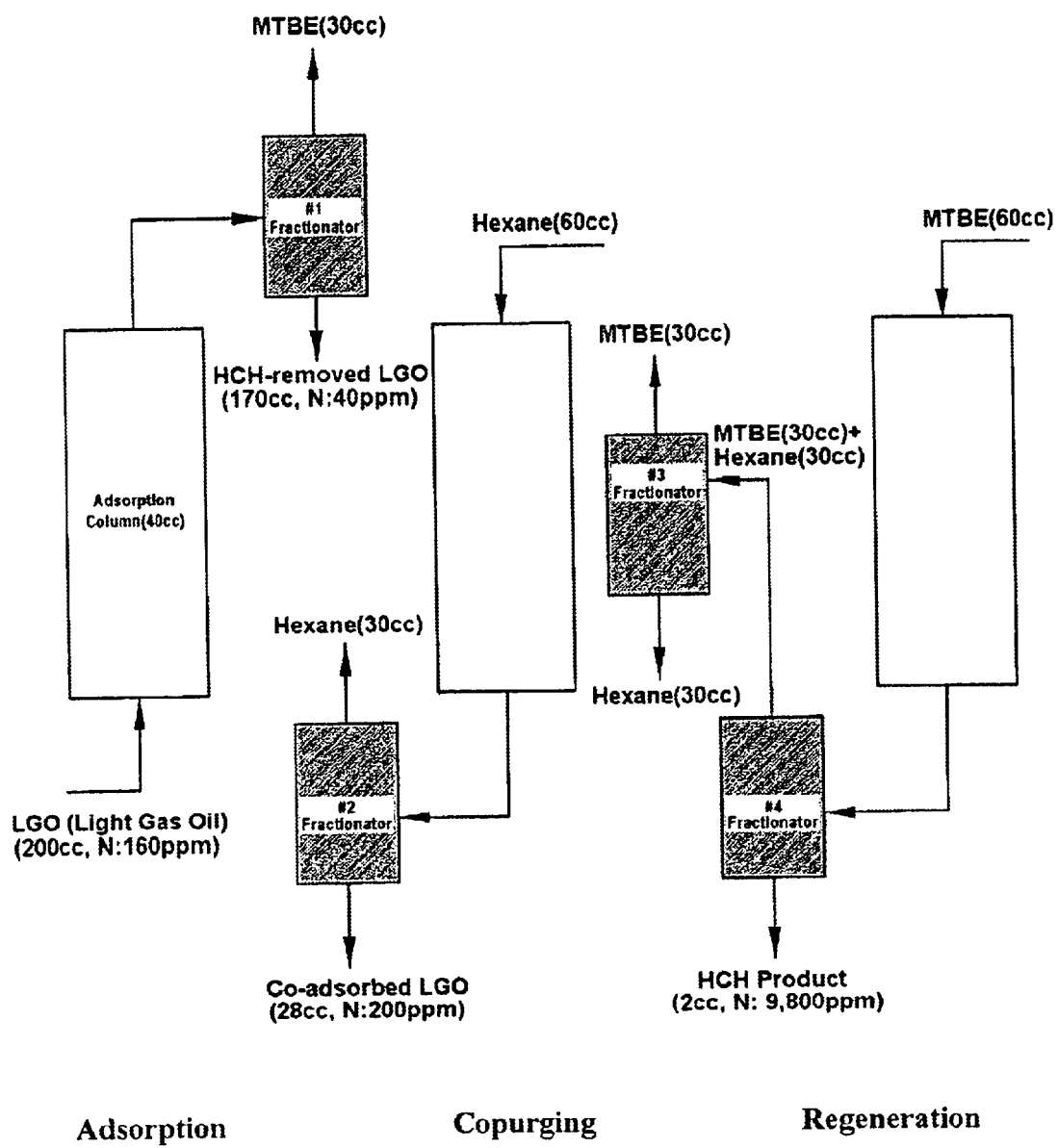
FIG. 1 is a schematic diagram illustrating a conventional process using a nonpolar solvent for copurging.
Figure 2:
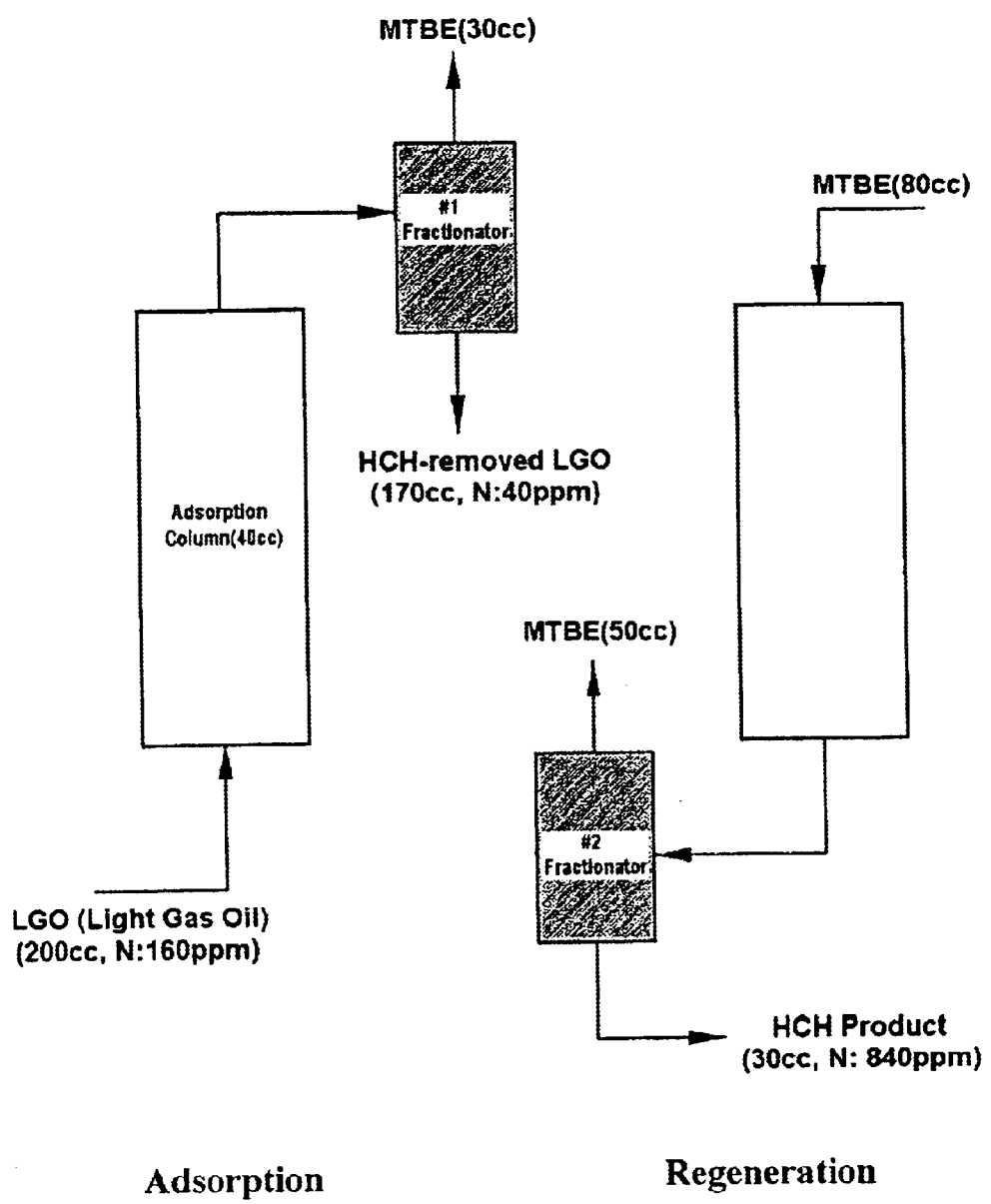
FIG. 2 is a schematic diagram illustrating a conventional process without copurging.
Figure 3:
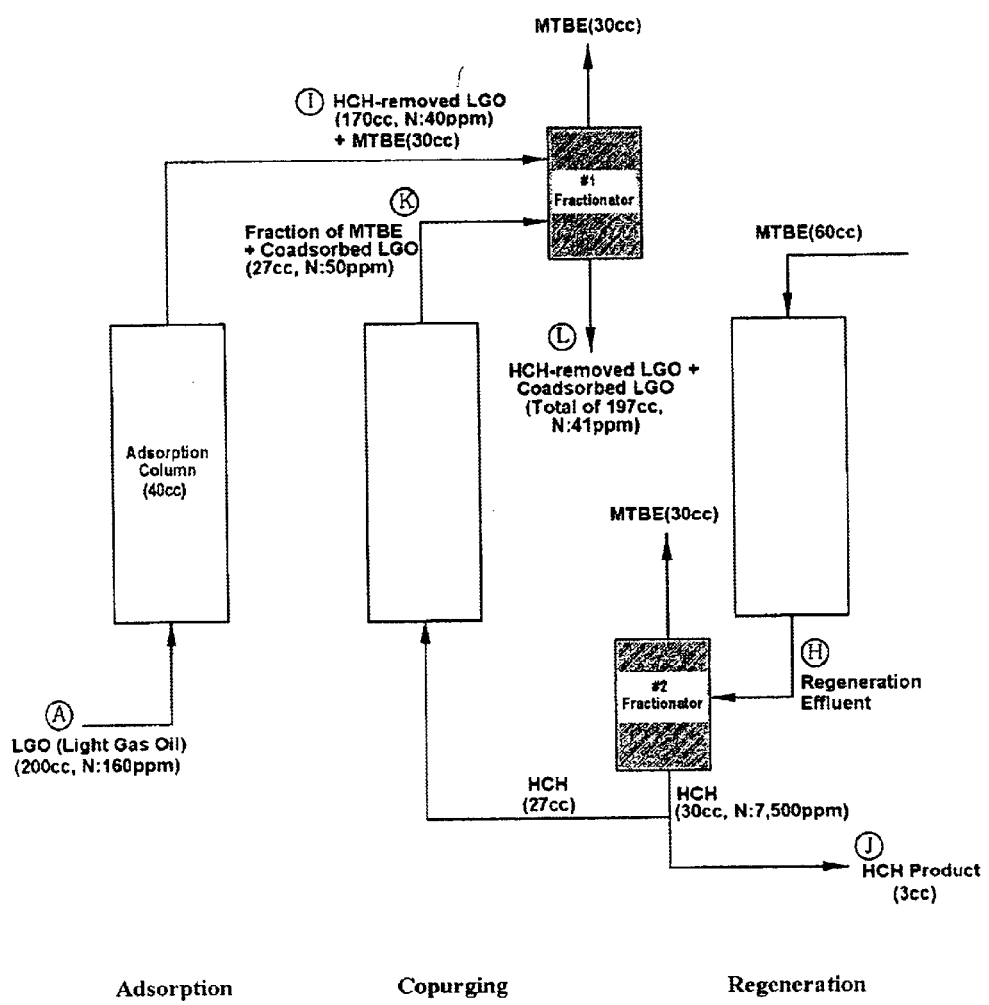
FIG. 3 is a schematic diagram illustrating an embodiment of the present invention, in which HCH are used for copurging.
Figure 4:
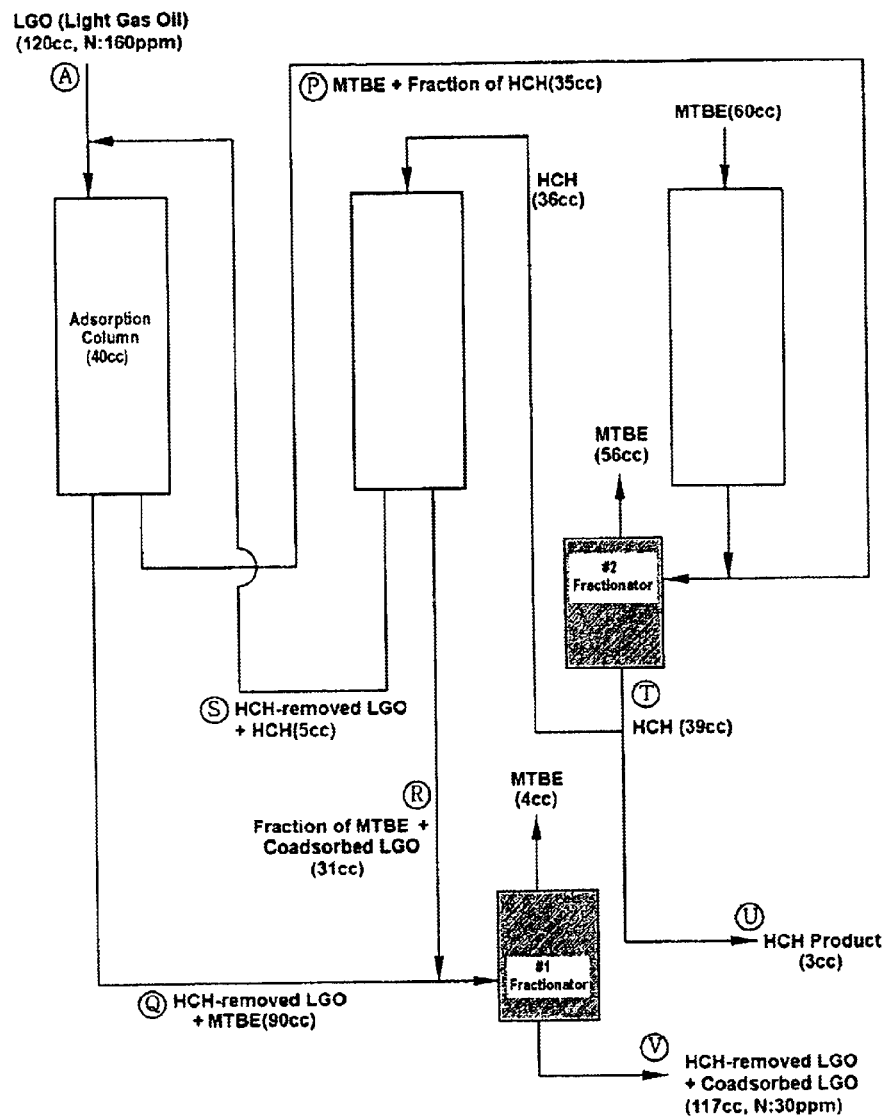
FIG. 4 is a schematic diagram illustrating another embodiment of the present invention, in which HCH are used for copurging.

Effective copurging is then sought to minimize HCH product generation and to increase HCH concentration therein. As illustrated in FIG. 1, an adsorption process using a non-polar solvent for copurging is proven to be greatly disadvantageous in investment expenses and operation costs. On the other hand, as given in FIG. 2, an adsorption process without copurging generates 15% HCH product, making the process economically unfeasible. To overcome such shortcomings, as illustrated in FIG. 3 and FIG. 4, copurging is carried out by reapplying a fraction of HCH, which is obtained from the previous operation, to the adsorber. As HCH are preferentially adsorbed onto the adsorber in place of coadsorbed hydrocarbons, the coadsorbed hydrocarbons are displaced, resulting in a copurging effluent of very low HCH content. The copurging effluent is then combined with adsorption effluent before being sent to the first fractionator, where the polar solvent and HCH-depleted hydrocarbon are separated. Given below in Table 2 are representative properties of LGO feedstock and HCH product.

TABLE 2

|  | LGO | HCH product of LGO |
| --- | --- | --- |
| Specific Gravity | 0.85–0.86 | 0.90–0.95 |
| Color | Yellow | Dark Brown |
| N content | 160 ppm | 5,000–10,000 ppm |

Upon completion of copurging, the polar solvent is applied to the adsorber, purging remaining adsorbate. Regeneration effluent, which is now an HCH-rich adsorbate-polar solvent mix, is sent to the second fractionator where the polar solvent and HCH are separated. As most of the HCH obtained in the second fractionator are reserved for the next copurging, a fraction of them are taken out as the HCH product. Repetitions of the aforementioned procedures concentrate HCH in the HCH product, and consequently, the nitrogen content and density thereof increase until the process reaches an equilibrium in approximately 40–80 operations. The present invention is applicable to treatment of middle distillates such as LGO and kerosene, the evaporation of which is economically impractical because of high boiling points.

Figure 5:
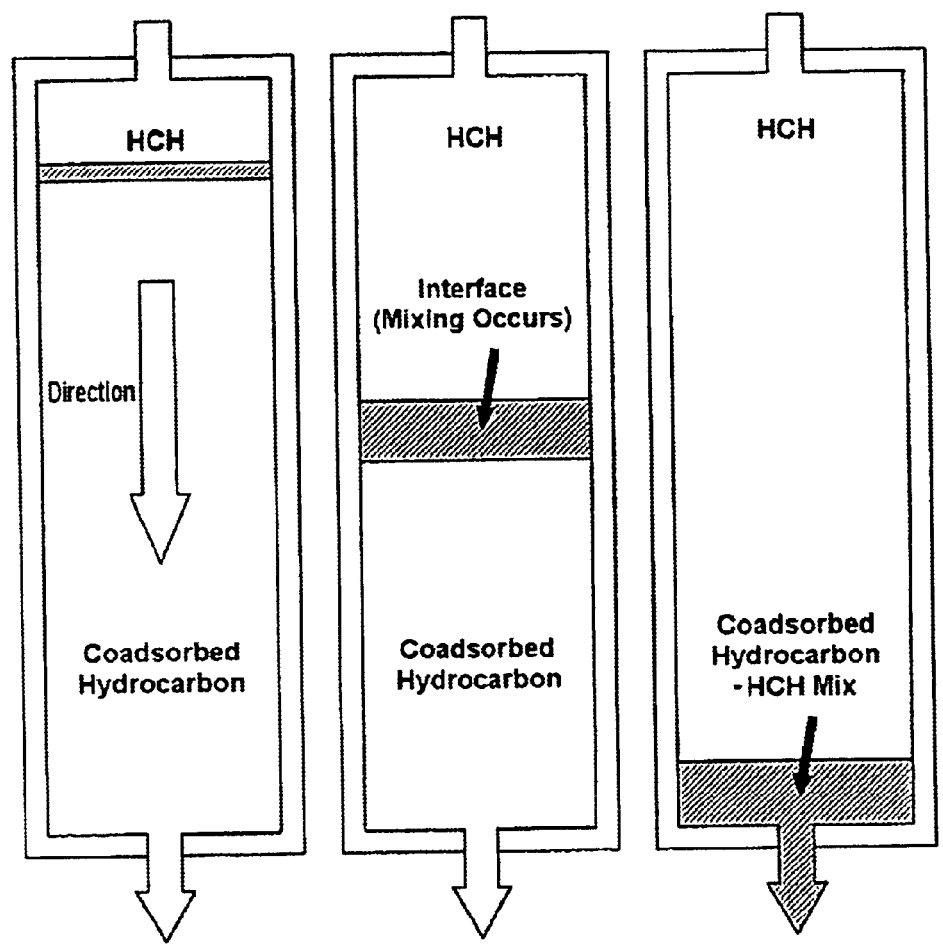
FIG. 5 is a drawing illustrating copurging of the present invention, in progress.

FIG. 5 illustrates copurging in progress. Since HCH have higher polarities and specific gravities compared to hydrocarbon, they can effectively displace coadsorbed hydrocarbons. As copurging progresses, coadsorbed hydrocarbons in the adsorbate and applied HCH form a distinct interface where mixing between the two fluids occurs. A small amount of such an HCH-coadsorbed hydrocarbon mix needs to be adsorbed again in the next adsorption. Copurging can be more effective when silica gel is fully wetted. When silica gel is completely immersed with a liquid, flow characteristics inside the adsorber resemble ideal plug flow, as long as the space velocity is not too fast. Once this condition is disrupted, mixing at the interface intensifies, resulting in HCH-rich copurging effluent.

Upon completion of copurging, the bed is filled with HCH. An amount of the polar solvent necessary for regeneration, however, remains unchanged from the case without copurging, as given in FIG. 2. Copurging reduces HCH product generation to a tenth while increasing HCH concentration therein ten-fold. Still, such HCH product generation is approximately 1.5 times larger than the case with hexane copurging, as given in FIG. 1. The present invention, however, is advantageous in saving investment expenses for additional fractionators, reducing operation costs for recovering two solvents, and minimizing the amount of copurging effluent that requires repetitive adsorption.

ILLUSTRATIVE EXAMPLES

A better understanding of the present invention may be obtained in light of the following examples that are set forth to illustrate, but are not to limit the present invention. In the following examples, LGO, of which the boiling point, nitrogen, and sulfur content are 225° C. to 365° C., 160 wppm and 14,000 wppm, respectively, is exclusively used, and represented hereinafter as "A". Concentric glass columns are maintained in the vicinity of 50° C. by constantly circulating water in the annulus of the columns while the inner column is charged with 40 cc of silica gel, of which the diameter is between 0.2 and 0.5 mm.

Example I

Nitrogen Removal Effectiveness of Silica Gel

Figure 7:
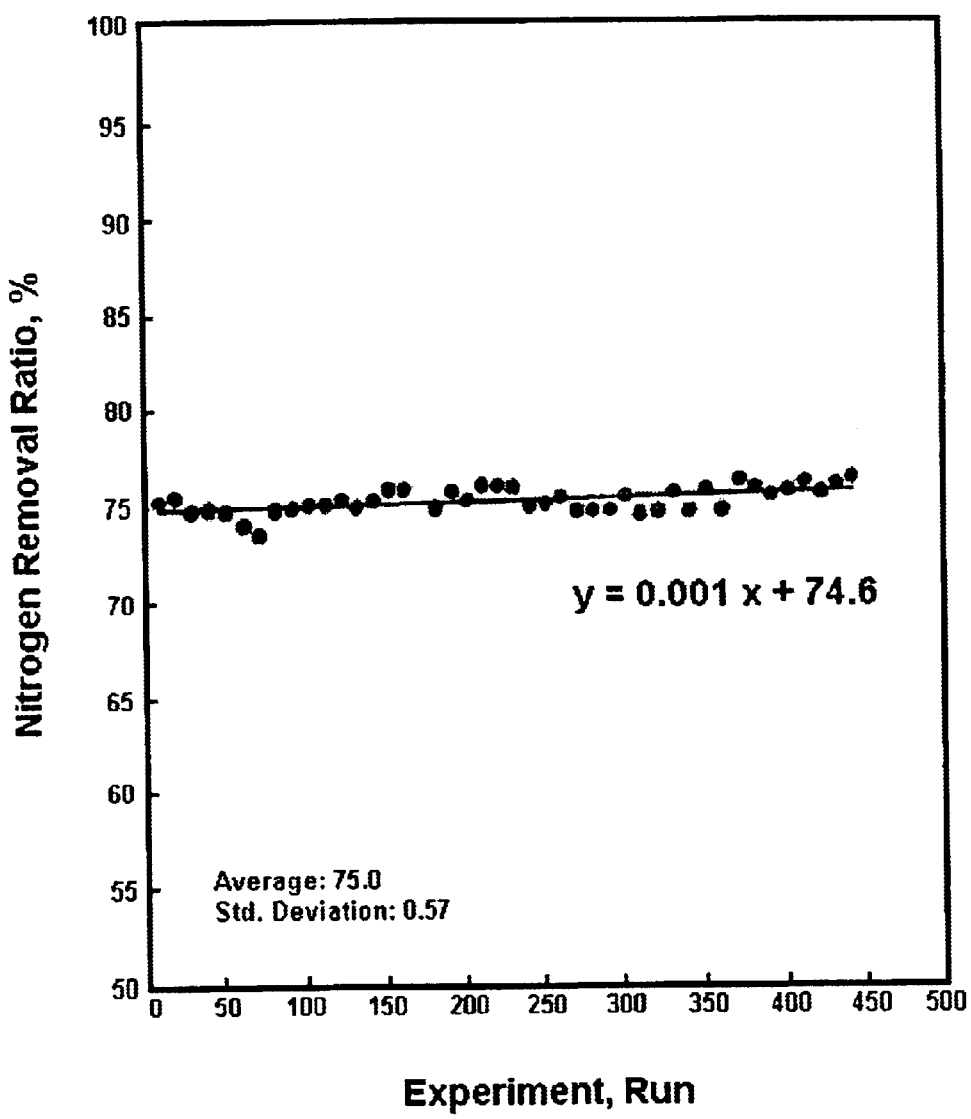
FIG. 7 is a graph showing a nitrogen removal ratio of the present invention.

HCH are removed from "A" using alumina, silica gel, bauxite, and acidic kaolin. Among these adsorbents, when regenerated by a polar solvent, only silica gel turns out to maintain a constant nitrogen removal ratio after repetitive adsorption and regeneration. In order to examine adsorption effectiveness, i.e. a nitrogen removal ratio, of silica gel over the extended period of time, a series of experiments are conducted as described below, and the corresponding results are given in FIG. 7.

1) 200 cc of "A" is fed to the inner column at 400 cc/hr in the upward direction;
2) adsorption effluent, which is collected at the top of the inner column, is kept in a container, labeled as "B";
3) 80 cc of MTBE is flowed through the inner column in the downward direction at 400 cc/hr;
4) regeneration effluent, which is collected at the bottom of the inner column, is discarded;
5) the procedures of steps 1) to 4) are repeated 10 times, and ten samples of "B" are poured into a single container and shaken well;
6) a small amount of "B mix" is then sampled, labeled as "C";
7) after MTBE is evaporated from "C" with use of a vacuum rotary evaporator, the nitrogen content of "C" is measured; and
8) the procedures of steps 1) to 7) are repeated 45 times.

Example II

Identification of Optimal Physical Properties of Silica Gel

Experiments are conducted to identify optimal physical properties of silica gel, and it is found that silica gel with a pore size of 40~100Å and a pore volume ratio to bulk volume of 0.40 or greater is desirable. A series of experiments are conducted with 8 different silica gels as described below, and the corresponding results are given in Table 3.

1) 400 cc of "A" is fed to the inner column at 400 cc/hr in the upward direction;
2) adsorption effluent, which is collected at the top of the inner column, is kept in a container, labeled as "D",
3) 80 cc of MTBE is flowed through the inner column in the downward direction at 400 cc/hr;
4) regeneration effluent, which is collected at the bottom of the inner column, is discarded;
5) the procedures of steps 1) to 4) are repeated 3 times, and three samples of "D" are poured into a single container and well shaken;
6) a small amount of "D mix" is then sampled, labeled as "E";
7) after MTBE is evaporated from "E" with use of a vacuum rotary evaporator, the nitrogen content of "E" is measured; and
8) the procedures of steps 1) to 7) are repeated with each of 8 different silica gels.

TABLE 3

| Pore Volume Ratio to Bulk Volume (cc/bulk cc) | Pore Size (Å) | Surface to Bulk Volume ($m^2$/bulk cc) | Nitrogen Removal Ratio(%) |
| --- | --- | --- | --- |
| 0.2625 | 184.8 | 56.9 | 44.4 |
| 0.4292 | 164.4 | 104.9 | 47.0 |
| 0.3555 | 25.9 | 504.2 | 21.6 |
| 0.3848 | 48.6 | 316.1 | 52.5 |

TABLE 3-continued

| Pore Volume Ratio to Bulk Volume (cc/bulk cc) | Pore Size (Å) | Surface to Bulk Volume (m²/bulk cc) | Nitrogen Removal Ratio(%) |
|---|---|---|---|
| 0.3002 | 20.2 | 579.2 | 6.6 |
| 0.4408 | 234.4 | 75.3 | 49.7 |
| 0.4280 | 104.4 | 164.4 | 53.1 |
| 0.4725 | 69.0 | 273.6 | 61.2 |

Example III

Nitrogen Removal Effectiveness with Respect to VFA

For convenience sake, a feedstock amount is quantified in a dimensionless form of VFA (Volumetric ratio of Feedstock to Adsorber): it is defined as a volumetric ratio of feedstock treated to adsorbent charged. According to the present invention, it was discovered that the nitrogen removal ratio tends to be inversely proportional to the logarithm of VFA. In other words, as more LGO is adsorbed onto silica gel, the less effective the adsorbent becomes. The effectiveness declines logarithmically. To verify the point, a series of experiments are conducted with VFA of 3, 5, and 10 as described below. The corresponding results are given in Table 4.

1) 120 cc (VFA of 3) of "A" is fed to the inner column at 400 cc/hr in the upward direction;
2) adsorption effluent, which is collected at the top of the inner column, is kept in a container, labeled as "F";
3) 80 cc of MTBE is injected into the inner column in the downward direction at 400 cc/hr;
4) regeneration effluent, which is collected at the bottom of the inner column, is kept in a container, and labeled as "G";
5) after MTBE is evaporated from "F" and "G" with the use of a vacuum rotary evaporator, their volumes and nitrogen contents are measured, respectively; and
6) the procedures of steps 1) to 5) are repeated with 200 cc (VFA of 5) and 400 cc (VFA of 10) of "A".

TABLE 4

| VFA | Adsorption Effluent (F) | HCH Product Volume (G) | Nitrogen Removal Ratio (F) |
|---|---|---|---|
| 3 | 90 cc | 30 cc(25%) | 81% |
| 5 | 170 cc | 30 cc(15%) | 75% |
| 10 | 370 cc | 30 cc(7.5%) | 63% |

In order to achieve a nitrogen removal ratio of 80% or higher, VFA needs to be no more than 5. Under such a VFA requirement without proper copurging, 15% to 25% of the feedstock could turn into an HCH product as shown in Table 4.

Example IV

Copurging with HCH

To clearly illustrate the advantages of the present invention, a series of experiments are conducted, using HCH for copurging, as depicted in FIG. 3. The corresponding results are given in Table 5.

1) 200 cc (VFA of 5) of "A" is fed to the inner column at 400 cc/hr in the upward direction;
2) adsorption effluent, which is obtained at the top of the inner column, is discarded;
3) 60 cc of MTBE is flowed through the inner column in the downward direction at 400 cc/hr;
4) regeneration effluent, which is collected at the bottom of the inner column, is put in a vacuum rotary evaporator to separate MTBE;
5) HCH, which are obtained in the vacuum rotary evaporator, are kept in a container, labeled as "H";
6) 200 cc (VFA of 5) of "A" is fed to the inner column at 400 cc/hr in the upward direction;
7) adsorption effluent, which is collected at the top of the inner column, is kept in a container, labeled as "I";
8) 3 cc of "H" is set aside labeled as "J", and the rest, 27 cc, is injected into the inner column at 80 cc/hr in the upward direction;
9) copurging effluent, which is collected at the top of the inner column, is kept in a container, labeled as "K";
10) "I" and "K" are poured into a single container, labeled as "L" and MTBE is evaporated from "L" using a vacuum rotary evaporator;
11) volumes and nitrogen contents of "J" and "L" are measured, respectively; and
12) the procedures of steps 3) to 11) are repeated 40 times.

At VFA of 5, the process is found to maintain a nitrogen removal ratio of 70% or higher, which is comparable to the case without copurging. The nitrogen content of "I" and "K" are 40 and 50 wppm respectively, and nitrogen content of "L", i.e. "I–K mix", is 41 wppm. The results of the experiments are given in Table 5. Although the nitrogen content of "J" is a mere 800 wppm in the initial experiment, 7,000 wppm is attained when the experiment is repeated more than 40 times.

TABLE 5

| VFA | Nitrogen Removal Ratio of L | Proportion of J, HCH Product (vol. %) |
|---|---|---|
| 3 | 80% | 1.75 |
| 5 | 74% | 1.50 |
| 10 | 62% | 1.25 |

Example V

Copurging with HCH in the Downward Direction

Figure 6:
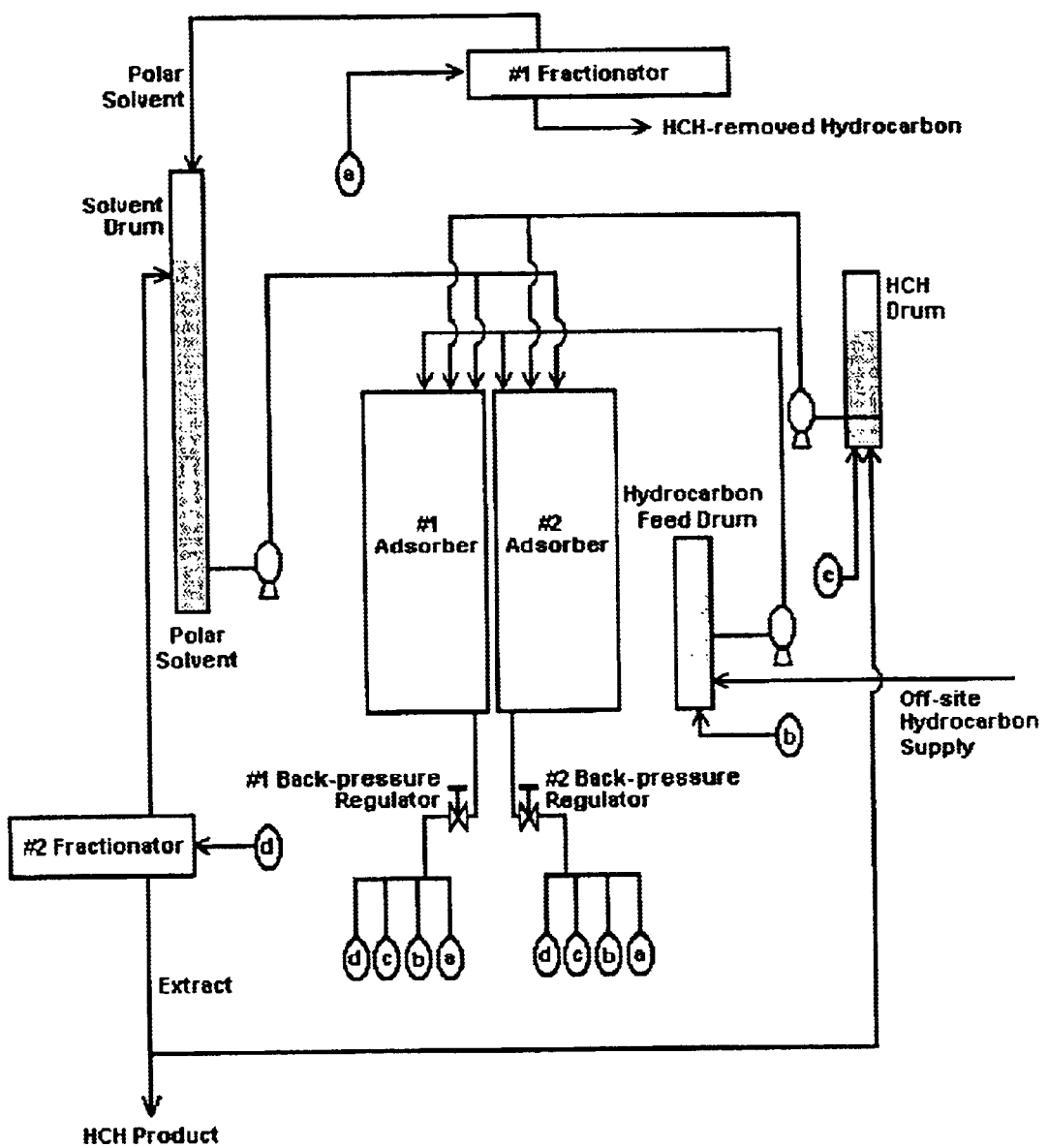
FIG. 6 is a PFD (Process Flow Diagram) of the present invention.

Adsorption, copurging and regeneration are carried out in the downward direction, to prove that the present invention is effective regardless of flow directions. To maintain an adsorber in fully wetted conditions, back-pressure regulators are attached as depicted in FIG. 6. A series of experiments are conducted as depicted in FIG. 4. The corresponding results are given in Table 6.

1) 120 cc (VFA of 3) of "A" is fed to the inner column at 80 cc/hr in the downward direction;
2) adsorption effluent, which is obtained at the bottom of the column, is discarded;
3) 60 cc of MTBE is flowed through the inner column in the downward direction at 80 cc/hr;
4) regeneration effluent, which is collected at the bottom of the inner column, is put in a vacuum rotary evaporator to separate MTBE;
5) HCH, which are obtained in the vacuum rotary evaporator, are kept in a container, labeled as "T";

6) 120 cc (VFA of 3) of "A" is fed to the inner column at 80 cc/hr in the downward direction;

7) the first 35 cc of adsorption effluent, which is collected at the bottom of the inner column, is kept in a container, labeled as "P" while the rest is discarded;

8) 3 cc of "T", is set aside labeled as "U", and the rest, 36 cc is injected into the inner column at 80 cc/hr in the downward direction;

9) the first 31 cc of copurging effluent, which is collected at the bottom of the inner column, is kept in a container, labeled as "R" while the rest is kept in another container, labeled as "S";

10) 60 cc of MTBE is flowed through the inner column in the downward direction at 80 cc/hr;

11) regeneration effluent, which is collected at the bottom of the inner column, is poured into the container "P" and MTBE is evaporated from "P" using a vacuum rotary evaporator;

12) HCH, which are obtained in the vacuum rotary evaporator, are kept in a container, labeled as "T";

13) 120 cc (VFA of 3) of "A–S mix" is fed to the inner column at 80 cc/hr in the downward direction;

14) the first 35 cc of adsorption effluent, which is collected at the bottom of the inner column, is kept in a container, labeled as "P" while the rest is kept in another container, labeled as "Q";

15) "R" and "Q" are poured into a single container, labeled as "V" and MTBE is evaporated from "V" using a vacuum rotary evaporator;

16) the procedures of steps 8) to 15) are repeated 40 times; and 17) the volumes and nitrogen contents of "U" and "V" are measured, respectively.

TABLE 6

| VFA | Nitrogen Removal Ratio of V | Proportion of U, HCH Product (vol. %) |
|---|---|---|
| 3 | 81% | 2.50 |

Industrial Applicability

Advantages of the present invention are summarized as follows: the adsorbent, silica gel, is regenerable for an extended period of time; a polar solvent such as MTBE is economically recovered due to its low latent heat and does not degrade the adsorbent; and coadsorbed hydrocarbons are efficiently displaced by the newly developed copurging, resulting in a small HCH product having a high HCH concentration.

As an alternative to the present invention, a refinery may adjust the distillation cut point of LGO to reduce the nitrogen content thereof. In this case, however, a drastic reduction in LGO yield is inevitable. For instance, in order to reduce the nitrogen content of LGO by 60%, the cut point should be readjusted to 225 to 335° C. Although the nitrogen content of LGO falls to 60–70 wppm from 160 wppm, the LGO yield is reduced by as much as 25%. Such a drop in production yield is intolerable to a refinery, from an economic standpoint.

As explained hereinbefore, the present invention contributes to the refining industry in the following aspects: the nitrogen content is reduced by more than 60% without a yield loss; the amount of HCH product is less than 2.0% of the throughput; and the HCH product may be applied to a blending stock for heating oil and/or a marine fuel. The sulfur and nitrogen content of the HCH product are, respectively, 1.5 times and tens of times higher than those of LGO.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the present invention may be practiced otherwise than as specifically described.

What is claimed is:

1. A process for removing and concentrating heteroatom compounds from a liquid hydrocarbon, the process utilizing an adsorber charged with silica gel and maintained in a fully wetted condition, a first fractionator and a second fractionator, the process comprising repeated cycles of the sequential steps of adsorption of the liquid hydrocarbon stream on the adsorber, copurging of the adsorber, and regeneration of the adsorber, wherein the adsorption of the liquid hydrocarbon comprises:
 (i) feeding the liquid hydrocarbon stream containing heteroatoms to the adsorber to provide:
  an initial polar solvent-rich adsorption effluent, which effluent comprises a polar solvent and a small amount of a first heteroatom compound-rich fraction having remained undesorbed in the previous adsorber regeneration, and
  a subsequent adsorption effluent, which comprises the polar solvent and adsorption-treated hydrocarbons; and
 (ii) passing the initial polar solvent-rich adsorption to the second fractionator, while passing the subsequent adsorption effluent to the first fractionator;

wherein the copurging of the adsorber comprises:
 (iii) feeding a heteroatom compound-rich stream to the adsorber to provide:
  an initial hydrocarbon-rich copurging effluent, which initial hydrocarbon-rich copurging effluent comprises hydrocarbons coadsorbed onto the adsorber during the adsorption in step (i) and a small amount of polar solvent, and
  a subsequent copurging effluent, which comprises an interfacial mixture between the hydrocarbon-rich copurging effluent and the heteroatom compound-rich stream; and
 (iv) passing the initial hydrocarbon-rich copurging effluent to the first fractionator, while combining the subsequent copurging effluent with the liquid hydrocarbon stream introduced to the adsorber in step (i);

wherein the regeneration comprises:
 (v) feeding a polar solvent stream to the adsorber to provide a regeneration effluent comprising a second heteroatom compound-rich fraction and polar solvent; and
 (vi) supplying the regeneration effluent to the second fractionator; and wherein:
 the adsorption-treated hydrocarbons and the coadsorbed hydrocarbons are separated from the polar solvent in the fist fractionator, the separated polar solvent is recycled as the polar solvent stream for step (v), and the separated hydrocarbons are recovered as a product; and the first and second heteroatom compound-rich fractions are separated from the polar solvent in the second fractionator, the separated polar solvent is recycled as the polar solvent stream for step (v), a portion of the separated heteroatom compound-rich fractions are recycled as the heteroatom compound-rich stream for step (iii), and a residual portion of the separated heteroatom compound-rich fractions is recovered as a byproduct.

2. The process as set forth in claim 1, wherein a source of said liquid hydrocarbon is a middle distillates with a boiling range of 100 to 400° C.

3. The process as set forth in claim 1, wherein said silica gel has a pore size of 40~100 Å and a pore volume ratio to bulk volume of 0.40 or higher.

4. The process as set forth in claim 1, wherein said polar solvent is selected from the group consisting of methyl-tertiary-butyl-ether, ethyl-tertiary-butyl-ether and tertiary-amyl-methyl-ether.

5. The process as set forth in claim 1, wherein said heteroatom compounds comprise one or more of nitrogen-containing compounds, sulfur-containing compounds, or oxygen-containing compounds.

* * * * *